No. 639,196. Patented Dec. 12, 1899.
P. FEHLING.
BICYCLE LOCK.
(Application filed Nov. 7, 1899.)
(No Model.)
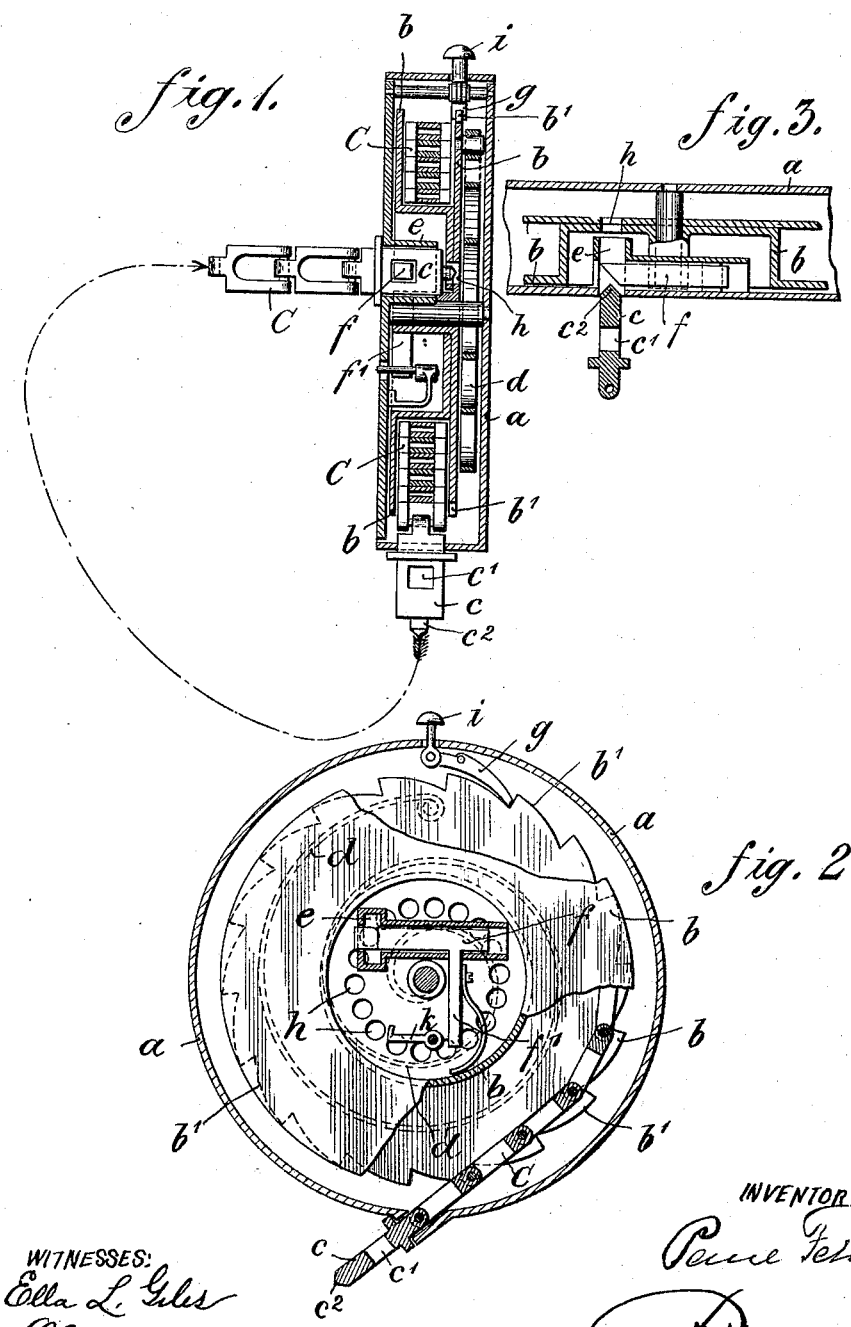
WITNESSES:
INVENTOR
ATTORNEYS

UNITED STATES PATENT OFFICE.

PAUL FEHLING, OF BERLIN, GERMANY.

BICYCLE-LOCK.

SPECIFICATION forming part of Letters Patent No. 639,196, dated December 12, 1899.

Application filed November 7, 1899. Serial No. 736,171. (No model.)

*To all whom it may concern:*

Be it known that I, PAUL FEHLING, a subject of the German Emperor, and a resident of Berlin, in the German Empire, have invented certain new and useful Improvements in Locking Devices for Bicycles and the Like, of which the following is a specification.

The invention relates to locking devices particularly applicable for bicycles, in which a casing containing a rotatable drum and a chain secured at one end to said drum and adapted to extend outside of the drum and to be locked at its free end in the casing are employed.

The present invention includes means for locking the drum against rotation after the free end of the chain is locked in the casing.

To this end the invention comprises a perforated plate secured to the drum and a pin secured to the free end of the chain, adapted to engage one of said perforations when said end of the chain is inserted in the casing to be locked therein.

In the accompanying drawings, wherein I have shown one form of construction of my device, Figure 1 is a vertical cross-section. Fig. 2 is a view of the interior thereof, and Fig. 3 is a horizontal sectional view of my invention.

In the drawings, $a$ represents a closed cylindrical box or case which may be attached to any convenient part of the bicycle-frame and contains a chain $C$ of considerable length, wound about a revolving spring-drum secured in the case. One end of the chain $C$ is fastened to the drum, while the other end of the chain—the link $c$, differently shaped than the other links—protrudes through an aperture in the circumference of the case $a$ and is prevented by a stop-pin or the like from being drawn into the box by reason of the action of the spring $d$ on the drum.

When it is desired to lock the bicycle provided with my improved device, the chain is drawn out from the case, then wound around or passed through the object to which the bicycle is to be secured and the end link $c$ passed through a suitable slot $e$ into the box or case $a$. A snap-lock is arranged centrally of the box or case $a$ near the aperture into which the end link $c$ is placed, and the bolt of this snap-lock is first pressed aside, the end link $c$ inserted into the aperture, and the bolt of the lock is then allowed to snap back into its original position, passing through a hole $c'$ in the end link, thus firmly securing the latter.

In Fig. 1 I have shown the end link $c$ before the chain has been drawn out of the case and after it has been drawn out and the end link secured by the bolt of the snap-lock.

In operating my device a pawl $g$ is used to prevent the chain, which has been drawn out, from slipping back into the case. The pawl $g$ fits into the pawl-teeth $b'$ of the ratchet-wheel, and thus when the pawl $g$ is inserted into one of the teeth $b'$ the drum will remain stationary.

As the entire length of the chain is not, as a rule, drawn out of the case, some part of it remaining therein, I have provided in order to prevent further drawing out of the chain a series of bores circular in form on the face of the drum, and into one of these bores $h$ a pin $c^2$ at the extremity of the end link $c$ penetrates, and thus prevents rotation of the drum.

The number and arrangement of the bores correspond to the pawl-teeth $b'$, so that one of the bores $h$ is exactly opposite the aperture $e$. The action of the drum being regulated by the spring $d$ and the pawl $b'$ and teeth $g$ of the ratchet-wheel by the arrangement just described, one of the bores $h$ must engage with the pin $c^2$ of the end link $c$.

In order to release the chain, the terminal link $c$ is withdrawn by pushing back the lock-bolt $f$ by means of a key fitting into the lock and the pawl $g$ is lifted free from the tooth-gear $b$ by pushing upon the knob $i$. The spring $d$ will then cause the drum to rotate and wind the chain $c$ upon itself.

I have represented the bit $k$ of the key inserted into the lock as acting upon one arm $f'$ of the bolt $f$. This is a very simple arrangement; but instead of this I may use a more complicated lock with tumblers, alarms, and the like if greater security is desired.

If there is no suitable object to which the chain can be secured, it may be passed through the spokes of one or both wheels of the bicycle, and in this manner render it impossible for anybody but the person having the key to release it.

Having now described my invention, what I claim, and desire to secure by Letters Patent, is—

1. In combination, a casing, a drum therein under tension, a chain secured to said drum at one end, means for securing the free end of the chain in the casing, and means for locking the drum to prevent the forward rotation of the same.

2. In combination, a casing, a drum under tension, a chain secured to the drum at one end, means for engaging the opposite end of the chain to lock the same, and means carried by the chain for locking said drum against forward rotation when said chain is locked.

3. In combination, a casing, a drum under tension, a perforated disk carried by the drum, a chain secured at one end to the drum, means for locking the free end of the chain and a pin carried by the chain adapted to engage the perforation in said disk to lock said drum, substantially as described.

In witness whereof I have hereunto set my hand in presence of two witnesses.

PAUL FEHLING.

Witnesses:
HENRY HASPER,
WILLIAM MAYNER.